(12) United States Patent
Kikuchi

(10) Patent No.: US 8,579,511 B2
(45) Date of Patent: Nov. 12, 2013

(54) TURNING BEARING WITH LOADING HOLE FOR INTRODUCTION OF SEPARATOR WITH ROLLER

(71) Applicant: Nippon Thompson Co., Ltd., Tokyo (JP)

(72) Inventor: Shunsuke Kikuchi, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 13/760,613

(22) Filed: Feb. 6, 2013

(65) Prior Publication Data

US 2013/0202239 A1     Aug. 8, 2013

(30) Foreign Application Priority Data

Feb. 6, 2012   (JP) ................................. 2012-022914

(51) Int. Cl.
*F16C 19/50*   (2006.01)

(52) U.S. Cl.
USPC ............................ 384/447; 384/619; 384/620

(58) Field of Classification Search
USPC .......... 384/447, 507, 508, 559, 584, 619, 620
See application file for complete search history.

(56) References Cited

U.S. PATENT DOCUMENTS

| | | | | |
|---|---|---|---|---|
| 4,606,654 A | * | 8/1986 | Yatsu et al. | 384/447 |
| 4,961,653 A | * | 10/1990 | Suzuki et al. | 384/447 |
| 5,026,177 A | * | 6/1991 | Masuda | 384/447 |
| 5,033,873 A | * | 7/1991 | Suzuki | 384/447 |
| 7,547,144 B2 | * | 6/2009 | Kunimoto et al. | 384/447 |
| 2009/0297081 A1 | * | 12/2009 | Kunimoto et al. | 384/447 |
| 2012/0308169 A1 | * | 12/2012 | Kuo et al. | 384/447 |

FOREIGN PATENT DOCUMENTS

| | | |
|---|---|---|
| JP | 2000314418 A | 11/2000 |
| JP | 2002013540 A | 1/2002 |
| WO | 2009020087 A1 | 2/2009 |

* cited by examiner

*Primary Examiner* — Thomas R Hannon
(74) *Attorney, Agent, or Firm* — Browdy and Neimark, PLLC

(57) ABSTRACT

A loading hole made in either of an outer ring and an inner ring is provided in two rows of raceways defined between the outer ring and the inner ring, one to each raceway. The loading hole is set out of the guide surface and, therefore there is no fear that a closure fitted in the loading hole causes any obstacle to the rolling movement of the rollers. The loading hole extends radially of the bearing at a location that a center line of the loading hole lies set-off or biased from a center of the roller. An opening edge of the loading hole is exposed to the raceway in a location out of the guide surface, so that the rollers are allowed to roll smoothly without touching with the innermost edge of the closure.

6 Claims, 13 Drawing Sheets

TURNING BEARING WITH LOADING HOLE FOR INTRODUCTION OF SEPARATOR WITH ROLLER

FIELD OF THE INVENTION

The present invention relates to a turning bearing or swivel bearing suitable for use in a turning or pivotal component installed in, for example a variety of assembling machines, machine tools, industrial robots, semiconductor fabricating equipment and the like and, more particularly, this invention relates to a turning bearing or swivel bearing in which either of an outer ring and an inner ring serving as turning or pivotal components has a loading hole to incorporate a roller together with a separator between the turning components.

BACKGROUND OF THE INVENTION

A conventional double-row roller bearing is disclosed in international publication No. WO2009/020087, which is composed of an outer ring whose inside circular surface has two rows of outside grooved tracks, or races, extending circumferentially of the outer ring, an inner ring whose inside circular surface has two rows of inside grooved races extending circumferentially of the inner ring in opposition to the outside grooved races of the outer ring to define raceways between the outside grooved races and inside grooved races, and a plurality of rollers lying in the raceways so as to circulate through the raceways with carrying loads as the inner ring and the outer ring rotate relative to each other. With the outside and inside grooved races, the race surfaces on which the rollers roll through intersect with skew regulator surfaces to form a substantially V-shape in a transverse cross-section. The skew regulator surfaces face to axially opposite ends of the rollers with leaving minute clearances between them. On the skew regulator surfaces on the outside grooved races, moreover, there are each provided a circular ridge flanked by annular recesses extending circumferentially of the inside circular surface of the outer ring, the circular ridge lying in opposition to a rotation axis of the roller. On the skew regulator surfaces on the inside grooved races, there are each provided a circular ridge flanked by annular recesses extending circumferentially of the outside circular surface of the inner ring, the circular ridge lying in opposition to a rotating axis of the roller. Furthermore, the outer ring has passages extending radially from the floors of the outside grooved races to release lubricant.

Of some commonly-assigned Japanese patent applications concerned with roller bearings, the commonly-assigned Japanese Laid-Open Patent Application 2000-314 418 discloses an angular-contact roller bearing constructed to make assembling work and downsizing easier. With the prior angular-contact roller bearing constructed as shown in FIG. 19, a plurality rows of raceways 60 is formed between an outer ring 51 and an inner ring 52, and the rollers 53 are disposed in the raceways 60 in such a fashion that their rotation axes are tilted or askew with respect to a rotating shaft to support the outer ring 51 and the inner ring 52 for rotation. The outer ring 51 has a loading hole 55 to charge the rollers 53 into the raceways 60 through there. The loading hole 55 is closed with a plug 67 after the completion of introduction of the rollers 53 into the raceways 60. With an inside circular surface 58 of the outer ring 51, there is no difference or gap in level on opposite sides of the outside grooved race 56. With an outside circular surface 59 of the inner ring 52 as well, there is no difference or gap in level on opposite sides of the inside grooved race 57. Both the outside grooved race 56 and the inside grooved race 57 have a V-shape in a transverse cross-section, whose one sides are race surfaces 63 and 65 coming into rolling contact with the circular rolling surfaces 61 of the rollers 53 and whose the other sides are guide surfaces 64 and 66 born against the axially opposite ends 62 of the rollers 53. The race surfaces 63 and 65 and the guide surfaces 64 and 66 are made identical in configuration with each other. The angular-contact roller bearing constructed as stated earlier, moreover, has separators 54 each of which is interposed between any adjacent rollers 53 lying between the grooved races 56 and 57 (refer to FIG. 20). The separator 54 as shown in FIG. 20 includes an upper surface 68 and lower surface 69 lying in opposition to race surfaces 63 and 68 of the races, along which the rollers 53 roll through, with leaving slight clearances to keep the upper and lower surfaces 68, 69 apart from the race surfaces 63 and 68, a major column 70 joining the upper and lower surfaces 68 and 69 together, and edge surfaces lying in opposition to guide surfaces of the races, against which the axially opposite ends 62 of the rollers 53 are opposed, with leaving slight clearances to keep the edge surfaces apart from the guide surfaces. The separator 54 has leading and trailing major sides concaved in symmetry with each other to fit over the rollers 53. Moreover, the concaved surfaces on the major sides are contoured in arced or curved profiles that the concaved sides bulge or rise gradually as their concavities get closer towards the centers thereof, so that the rollers 53 are guided while turning, with coming into touch with only the bulged centers in the concaved sides of the separator 54.

Another prior double-row turning bearing as shown in FIG. 21 is described in Japanese Laid-Open Patent Application No. 2002-13 540, in which a plurality of rolling elements of rollers 73 is installed in double rows of raceways 74 defined between an outer ring 71 and an inner ring 72. Especially, the prior double-row turning bearing is composed of the outer ring 71 having an inside circular surface on which double rows of grooved races 75 are formed to extend circumferentially of the inside circular surface, the inner ring 72 placed inside the outer ring 71 and having an outside circular surface on which double rows of grooved races 76 are formed to oppose circumferentially to the grooved races 75 on the outer ring 71, and a plurality of rolling elements 73 installed in double rows of the raceways 74 defined between the grooved races on the outer ring and the inner ring. Either of the outer ring 71 and the inner ring 72 has a loading hole 77 on each raceway 74, which extends radially of the ring to make it possible to charge the rolling elements 73 into the raceway 74.

Meanwhile, with the prior turning bearing with a plurality of rows of rollers, either of the outer ring having the outside grooved races of substantially V-shape in transverse cross-section and the inner ring having the inside grooved races of substantially V-shape in transverse cross-section has a loading hole to charge or load through there the rollers together with the separators into the raceways which are defined between the outside grooved races and the inside grooved races. To this end, the loading hole is open to either of the outer ring and the inner ring. The loading hole is plugged with a closure after the raceways have been charged with rollers together with the separators. The inmost edge of the closure is cut in conformity with the transverse cross-section of the grooved races. On the other hand, both the outside grooved race and the inside grooved race each have a race surface with which the rollers come into rolling contact at their rolling surfaces and a guide part with which the rollers come into sliding contact while turning at their axially opposite ends thereof. Nevertheless, as the loading hole is open to either of the outside grooved race and the inside grooved race, the closure after having fitted into the loading hole is liable to jut above the grooved race at the inmost edge thereof to cause any difference in level in the grooved race. Looking at the traveling motion of the rollers in the raceways, the rollers at their rolling surfaces come into rolling contact with the race surfaces of the grooved races and at their axially opposite ends come into sliding contact while turning with the guide surfaces of the grooved races. Thus, the prior closure inserted in the loading hole poses a major challenge that the rollers while rolling past the opening in the guide surface fall into any difference or catch on the inmost edge of the closure around the opening in the grooved race. Just as the roller has fallen into any difference or caught on the inmost edge of the closure, the rotating axis of the roller gets tilt and therefore the roller leans out of the right rolling posture to ensure smooth rolling motion of the roller. Thus, the roller with the rotating axis askew causes an obstacle to smooth rolling motion of the roller and hinders the smooth relative rotation between the outer ring and the inner ring through the rollers.

SUMMARY OF THE INVENTION

The present invention has as its principal object to overcome the challenges stated earlier. The present invention provides a turning bearing or swivel bearing, which is composed of an outer ring and an inner ring each of which has two rows of grooved races, a plurality of rollers lying in raceways defined between the grooved races to circulate the raceways while carrying loads, separators lying in the raceways to isolate adjacent rollers apart from each other, and a closure to plug a loading hole which is made in either of the outer ring and the inner ring to charge or incorporate the rollers with the separators into the raceways. More especially, the present invention provides a turning bearing double-row roller bearing in which the loading hole to incorporate or throw the rollers into the raceway is made every raceway, one to each raceway, the loading hole extending radially of the bearing at a location that a center line of the loading hole lies set-off from the widthwise middle of the grooved race. As a result of the construction of the loading hole as stated earlier, there is no difference or gap in a guide surface coming into sliding contact with the axially opposite ends of the roller, the closure after having fit into the loading hole is free of engagement or collision with the rollers so that the rollers are allowed to roll smoothly without falling into the difference or gap or getting caught at the closure.

The present invention is concerned with a turning bearing having a loading hole to incorporate rollers with separators; comprising an outer ring provided on an inside circular surface thereof with two rows of outside grooved races, an inside ring provided on an outside circular surface thereof with two rows of inside grooved races in opposition to the outside grooved races of the outer ring, a plurality of the rollers lying in raceways defined between the outside grooved races and the inside grooved races to circulate through the raceways while bearing loads as the outer ring and the inner ring rotate relative to each other, a plurality of the separators lying in the raceways in an arrangement interposed between the rollers adjoining each other, and a closure closing the loading hole provided in either of the outer ring and the inner ring for charging the raceways with the rollers and the separators, wherein the loading hole to charge or incorporate the rollers into the raceways are provided every raceway, one to each raceway, and wherein the loading hole extending radially of the bearing at a location that a center line of the loading hole lies set-off center of the rollers rolling through raceways.

The outside grooved races and the inside grooved races include race surfaces on which circular rolling surfaces of the rollers are allowed to roll through and guide parts to guide one of axially opposite ends of the rollers, the guide parts being composed of guide surfaces to guide in a sliding manner axially opposite ends of the rollers and relief sides reaching bottoms of the raceways, and further an opening edge of the loading hole is exposed to the raceway at a location biased out of the guide part to range across from the race surface to the relief side of the guide part.

The loading hole has a circular configuration in a transverse cross-section. Moreover, the loading hole in transverse cross-section has a diametral dimension larger than a diagonal length of the roller, the diagonal length being expressed by $(Da^2+Lr^2)^{1/2}$ in which Da denotes a diametrical length of the roller and Lr denotes an axial length of the roller.

The closure to close the loading hole has an innermost end which is exposed to the raceway and formed to conform in shape to the raceway, and further the closure has an outermost end kept at a location receding below an outside edge of the loading hole.

With the turning bearing constructed according to the present invention, the outer ring has two rows of the outside grooved race of a V-shape in a transverse cross-section and the inner outer ring has two rows of the inside grooved race of a V-shape in a transverse cross-section, the outside grooved race and the inside grooved race each having a race surface on which the circular rolling surfaces of the rollers are allowed to roll through and a guide part to guide one of axially opposite ends of the rollers. Moreover, the inside circular surface of the outer ring is staggered or different in level on opposite sides of the outside grooved race to make the race surface greater than the guide part and the outside circular surface of the inner ring is staggered or different in level on opposite sides of the inside grooved race to make the race surface greater in wide dimension than the guide part.

With the turning bearing constructed as stated earlier, the loading hole to incorporate the rollers with the separators is provided every raceway, one to each raceway, in such an arrangement that the centerline of the loading hole extending towards the axis of the bearing is out of the center of the roller to expose the opening edge of the loading hole to the grooved race at a location biased towards the race surface in the grooved race out of the rotating axis of the roller on the guide surface born against the axially opposite ends of the roller. Thus, the axially opposite ends of the roller move while turning with keeping contact at two locations with the tapered guide surfaces. Moreover, even though the inmost end of the closure fitted in the loading hole is somewhat recessed back below the grooved race so as not to jut above the guide surface, there is no fear that the rollers while rolling past the loading hole would fall into or strand on the gap or difference caused by the loading hole and the closure. Thus, the rollers are allowed to roll through in a desired posture without their rotating axes being swayed.

Further, the construction that the loading hole is provided every grooved race, one to each of the two grooved races, is advantageous to making less the stress applied to the closure from the rollers, compared with the construction in which a single closure is common to double rows of the grooved races, helping the smooth circulation of the rollers along the grooved races to facilitate smooth turning operation of the bearing. As the closure is held in the loading hole at a depth somewhat recessed back below the grooved race in the axial direction of the loading hole so as not to jut above the guide surface, there is no need of troublesome work to adjust the closure at the correct dept. This results in cost saving in production. In addition, as the loading hole has the diametral dimension larger than the diagonal dimension of the roller, the rollers even though having leant relative to the loading hole can be charged or thrown together with the separators into the raceway. This causes better assembling work. With the turning bearing of the present invention, moreover, the inmost edge of the closure is cut in conformity with the grooved race and the outermost end of the closure is kept at a location receding below the circumferential surface of either of the outer ring and the inner ring. Thus, the inmost edge of the closure complements or replaces the grooved race at the location of the loading hole to make sure of smooth rolling movement of the roller in the raceway. The closure is tough to experience any external impact and therefore protected against out of place.

DETAILED DESCRIPTION OF THE EMBODIMENT

Figure 1:
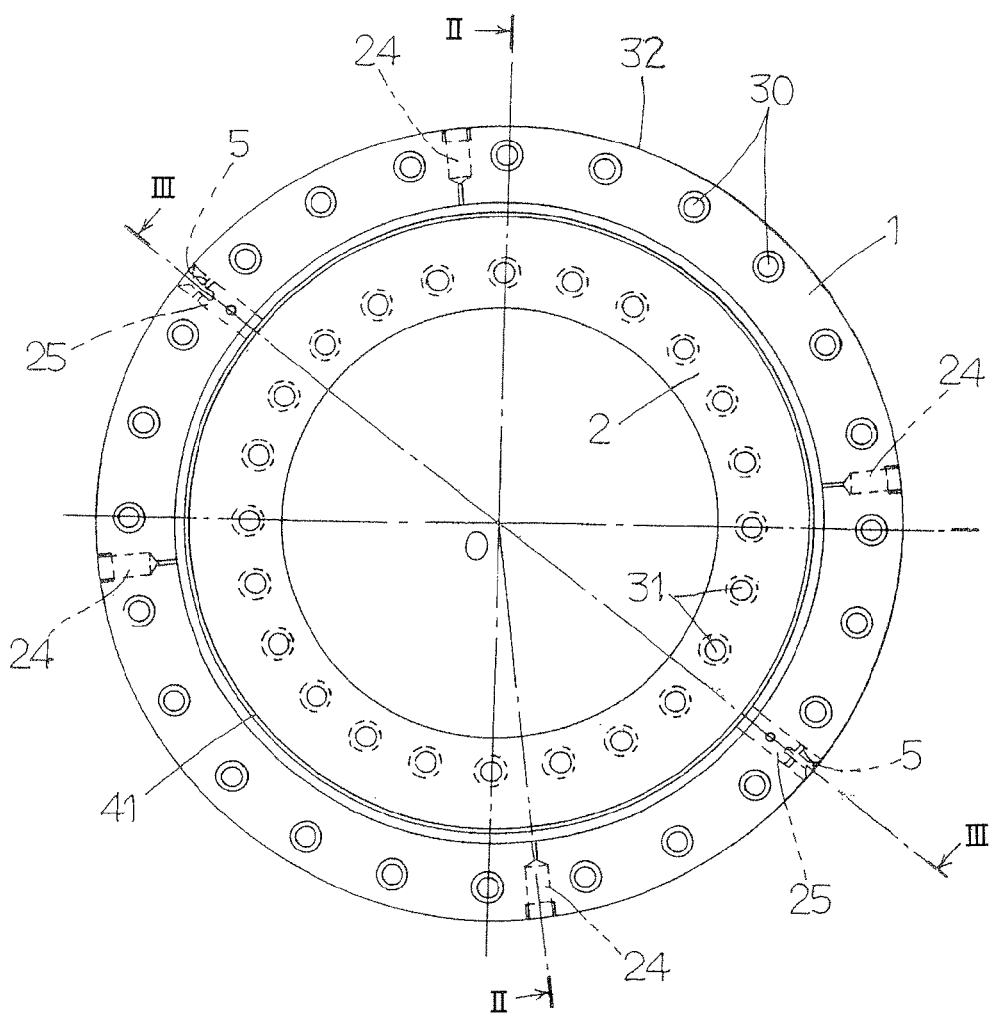
FIG. 1 is a view in front elevation of a preferred embodiment of a double-row angular roller bearing in a turning bearing constructed according to the present invention.
Figure 2:
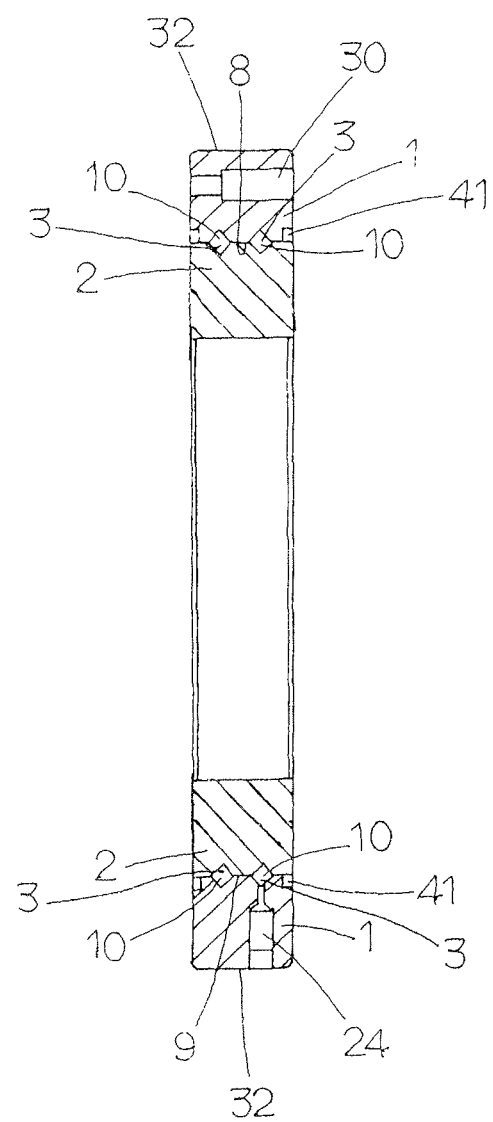
FIG. 2 is a view in transverse cross-section of the double-row angular roller bearing of FIG. 1, taken on the plane lying on the lines II-0-II of FIG. 1.
Figure 3:
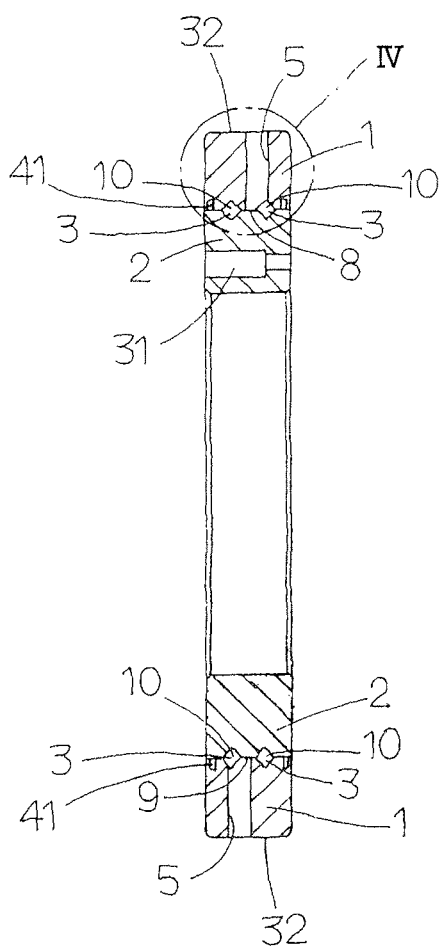
FIG. 3 is a view in transverse cross-section of the double-row angular roller bearing of FIG. 1, taken on the plane lying on the lines III-0-III of FIG. 1.

A preferred embodiment of the turning bearing constructed according to the present invention will be explained in detail with reference to the accompanying drawings. The turning bearing of the present invention will find extensive applications in relative turning, rocking and turning systems used in a diversity of machinery including semiconductor fabricating equipments, precision machines, measurement/inspection equipments, medical appliances, industrial robots, various assembling machines, transportation machines, machine tools, micromachines and so on.

Referring to FIGS. 1 to 4, the turning bearing of the present invention is in general composed of an outer ring 1, inner ring 2, and rollers 3 and separators 4 (see FIG. 12) lying in raceways 10 defined between the outer ring 1 and the inner ring 2, the separators 3 being disposed between the rollers adjoining each other. The turning bearing is a double-row angular-contact roller bearing in which either of the outer ring 1 and the inner ring 2, especially the outer ring 1 in the embodiment shown here, has a loading hole 5 to charge the rollers 3 and the separators 4 into the plural rows of raceways, especially two rows in the embodiment shown here, defined between grooved races 6 and 7 of V-shape in transverse section. With the outer ring 1, the outside grooved races 6 of V-shape in transverse cross-section are cut in an inside circular surface 8 of the outer ring 1. With the inner ring 2, the inside grooved races 7 of V-shape in transverse cross-section are cut in an outside circular surface 9 of the inner ring 2.

Figure 4:
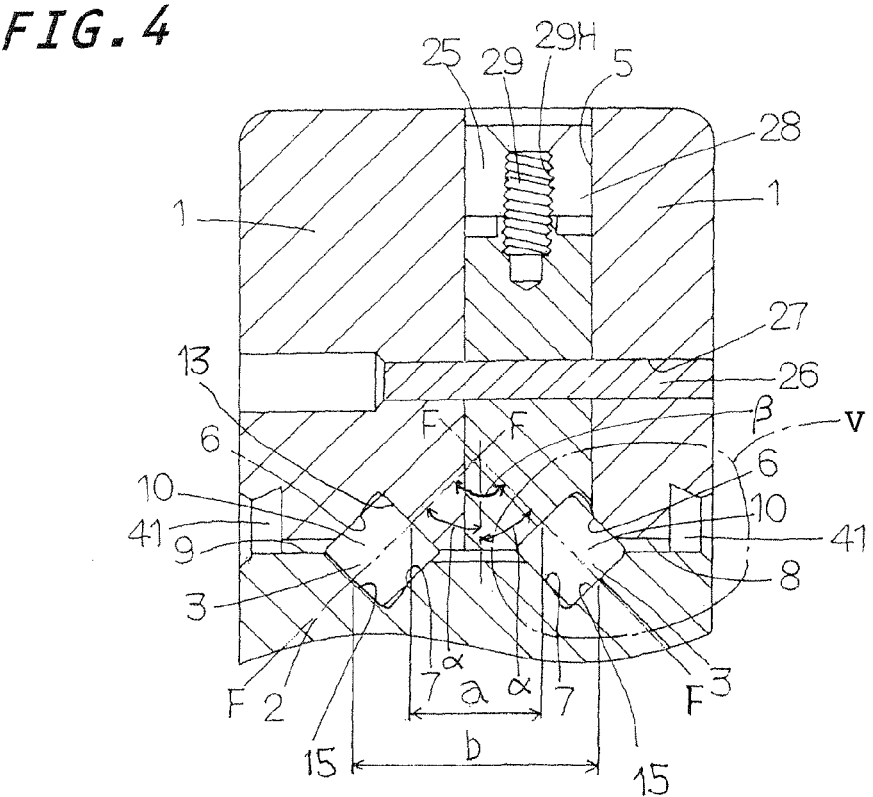
FIG. 4 is an enlarged view in transverse cross-section of an area encircled with a sign IV in FIG. 3.

In the embodiment discussed here, moreover, an angle α between a line of action F-F on the outside grooved race 6 and the inside grooved race 7 and a radial direction of the bearing axis, or a contact angle between a direction along which the load of the roller is born against the grooved races and a plane perpendicular to the bearing axis, is 45 degrees as shown in FIG. 4. As a result, a crossing angle β at which extended lines of lines of action F-F on the outside grooved races 6 and the inside grooved races 7 of the different rows intersect in perpendicular to each other is 90 degrees. The outer ring 1 and the inner ring 2 have some counterbored holes 30, 31 which are used to fasten the turning bearing to other components such as basements, instruments and so on. Though the grooved races 6, 7 in the angular-contact roller bearing may be placed in either of back-to-back arrangement and front-to-front arrangement, the grooved races 6, 7 in the angular-contact roller bearing of the present invention are designed in the back-to-back arrangement. With the back-to-back arrangement, as shown in FIG. 4, a distance b between center lines of race surfaces 15 in the inside grooved races 7 is larger than a distance a between center lines of race surfaces 13 in the outside grooved races 6. Moreover, the lines of action F-F of roller loads of the rollers 3 rolling through raceways 10 defined between the outside grooved races 6 and the inside grooved races 7 intersect each other outside the pitch circles of rollers 3. The angular-contact roller bearing of back-to-back arrangement is large in the distance between the lines of action of roller loads and, therefore, has a high load-carrying capacity against moment load.

According to the design specification in the embodied turning bearing of the present invention, for example, a diameter of the inside circular surface of the inner ring 2, or inside diameter of the ring 2 was 160 mm and a diameter of the outside circular surface 32 of the outer ring 1, or outside diameter of the ring 1 was 295 mm. Widths or breadths of the outer ring 1 and the inner ring 2 were each 35 mm. The ratio of a diameter Da and an axial length Lr of the roller 3 was for example nearly 1 to 1, especially, the dimension φ of the diameter Da was 6 mm and the axial length Lr was slightly smaller than the dimension φ of the diameter Da. With the turning bearing of the present invention, the axially opposite sides of the bearing have circular slots 41 to snugly fit over dust-proofing sealing members which extends circumferentially to exclude dirt and foreign matters from circular clearance left between the outside circular surface of the inner ring 2 and the inside circular surface of the outer ring 1. The outer ring 1 has oiling holes 24. With the embodiment illustrated, there were provided four oiling holes 24 which were arranged around the outer ring 1 in a way any adjacent two holes were spaced angularly away from each other across, for example 90 degrees. Each oiling hole 24 had a diameter φ of, for example 2 mm and female threads to fit over a tubular screw driven from an outside circular surface 32 of the outer ring 1.

More especially, the loading hole 5 is made every raceway 10, one to each raceway 10. The loading hole 5 extends radially of the bearing at a location that a center line H0 of the loading hole 5 lies set-off or biased from a center 0 of the roller 3 incorporated in the raceway 10. With the turning bearing of the present invention, a plurality of rollers 3 together with the separators 4 flanked by the rollers 3 is charged or incorporated through the loading hole 5. Moreover, the outside grooved race 6 and the inside grooved race 7 each have the V-shape in transverse cross-section thereof, one side of the V-shape being the race surface 13, 15 coming into rolling contact with circular rolling surfaces 11 of the rollers 3 and the other side being the guide part 14 against which axially opposite ends of the rollers 3 are born in a sliding manner. The race surface 13 of the outside grooved race 6 is made in a tapered or inclined surface 21 and the race surface 15 of the inside grooved race 7 is made in a tapered or inclined surface 22. The guide parts 14, 16 include guide surfaces 17, 18 to guide in a sliding manner the axially opposite ends 12 of the roller 3, and the relief sides 19, 20 reaching the bottoms of the raceways 10. An opening edge 15A of the loading hole 15 is exposed to the raceway 10 within a range across the relief side 19 in the axial direction of the bearing. Moreover, the loading hole 15 cut in either of the outer ring 1 and the inner ring 2 has a circular configuration in transverse cross-section having a diametral dimension larger than a diagonal length DL of the roller 3, which may be derived from $(Da^2+Lr^2)^{1/2}$ based on Pythagorean theorem, wherein Lr denotes an axial length of the roller 3.

With the embodied turning bearing of the present invention, the loading holes 5 to incorporate the rollers 3 with the separators 4 were provided around the outer ring 1 at two locations out of the interference with the oiling holes 24. The loading holes 5 were around either of the outer ring 1 and inner ring 2 at locations spaced circumferentially away from each other across 180 degrees. With the turning bearing constructed as stated earlier, a plurality of rollers 3 together with the separators 4 is charged or incorporated through the loading hole 5 in such a way the separators 4 are each flanked by the rollers 3. Moreover, the outer ring 1 as shown in FIG. 4 has a locking pin hole 27 extending across the loading hole 5. The closure 25 after having fit in the loading hole 5 is fastened to the outer ring 1 with a locking pin 26 driven into the locking pin hole 27. An example of the closure 25 applicable to the turning bearing is described in Japanese Laid-Open Patent Application No. 2010-230 053. The closure 25 has an innermost end which is exposed to the outside grooved race 6 of the outer ring 1 and made to conform in shape to the outside grooved race 6. Moreover, the closure 25 has slits 28 extended axially in circular wall of the closure 25 and another slits extended circumferentially near the deep ends of the slits 28. The closure 25 has a threaded hole 29H at the outermost end opposite to the innermost end thereof. As a flat-head screw 29 is tightened or wedged into the threaded hole 29H, the closure 25 is expanded radially outwards along the slits 28 to firmly secure the closure 25 inside the loading hole 5 in the outer ring 1. The outermost end of the closure 25 is kept at a location receding below the outside circular surface 32 of the outer ring 1.

Figure 5:
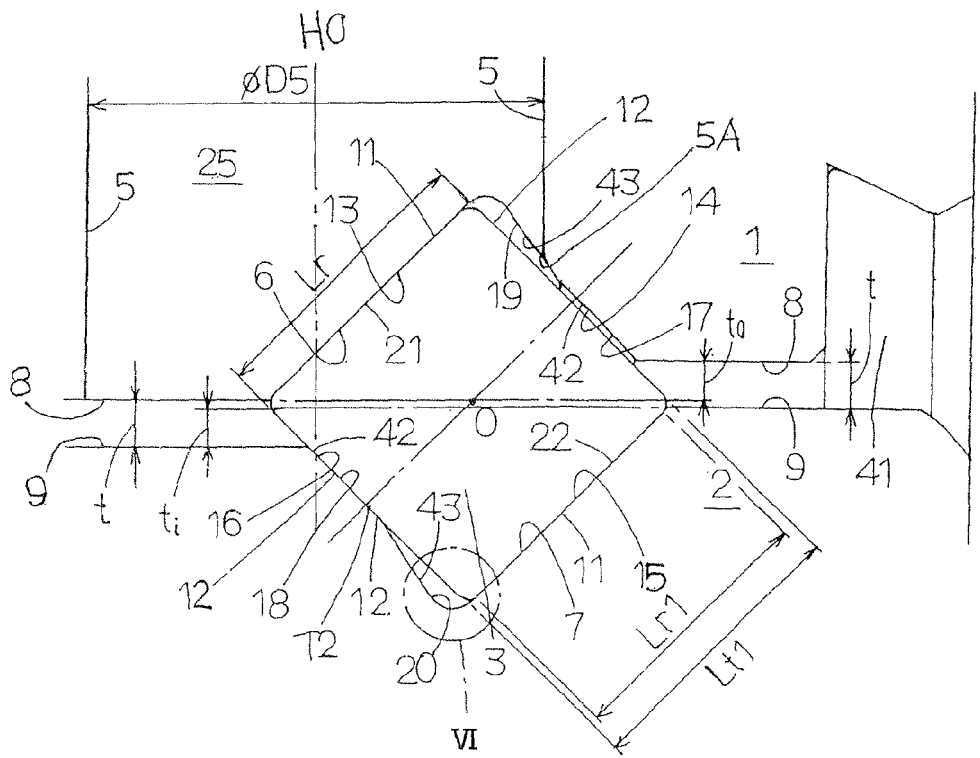
FIG. 5 is an enlarged view in transverse cross-section of an area encircled with a sign V in FIG. 4 to show a raceway defined between an inside grooved race cut in an outer ring and an outside grooved race cut in an inner ring.

With the turning bearing constructed according to the present invention, the inside circular surface 8 of the outer ring 1 is made staggered or different in level on opposite sides of the outside grooved race 6 while the outside circular surface 9 of the inner ring 2 is made staggered or different in level on opposite sides of the outside grooved race 7 so as to make greater the rolling-contact area of the race surfaces 13, 15 with the circular rolling surface 11 of the roller 3 and correspondingly less the contact area of the guide parts 14, 16 with the axially opposite ends of the roller 3. The outside grooved race 6 of the outer ring 1 as shown in FIGS. 4 and 5 has the V-shape in transverse cross-section, one side of the V-shape being the race surface 13 and the other side being the guide part 14. The guide part 14 includes a relief side 19 for the grinding tool (not shown) in machining procedure and a guide surface 17 for guidance of any one of the axially opposite ends 12 of the roller 3. The inside grooved race 7 of the inner ring 2 in turn has the V-shape in transverse cross-section, one side of the V-shape being the race surface 15 and the other being the guide part 16. The guide part 16 includes a relief side 20 for the tool (not shown) in machining procedure and a guide surface 18 for guidance of the other one of the axially opposite ends 12 of the roller 3. Moreover, the outside grooved race 6 on the outer ring 1 is constituted with the race surface 13 on which the circular rolling surface 11 of the roller 3 rolls through, the race surface 13 lying in widthwise inner side of the outer ring 1, and the guide part 14 having the guide surface 17 on which any one of the axially opposite ends 12 of the roller 3 is born to slide while turning on its own axis, the guide part 14 lying in widthwise outer side of the outer ring 1. The inside grooved race 7 on the inner ring 2 is constituted with the race surface 15 on which the circular rolling surface 11 of the roller 3 rolls through, the race surface 15 lying in widthwise outer side of the inner ring 2, and the guide part 16 having the guide surface 17 on which the other one of the axially opposite ends 12 of the roller 3 is born to slide while turning on its own axis, the guide part 14 lying in widthwise inner side of the outer ring 2. The guide parts 14, 16 of the outside grooved race 6 and the inside grooved race 7 include the guide surfaces 17, 18 formed on the inside circular surface 8 of the outer ring 1 and the outside circular surface 9 of the inner ring 2, respectively, to guide the axially opposite ends of the roller 3, and the relief sides 19, 20 reaching the bottoms of the outside grooved race 6 and the inside grooved race 7, respectively. With the outer ring 1, moreover, the inside circular surface 8 lying on the side of the race surface 13 is more biased radially inwards toward the center of the ring 1 than the inside circular surface 8 lying on the side of the guide surface 17, so that the inside circular surface 8 on the outer ring 1 is made staggered or different in level on opposite sides of the outside grooved race 6 to make greater the race surface 13 than the effective contact length of the circular rolling surface 11 of the roller 3 and correspondingly less the guide part 14 in width than race surface 13. With the inner ring 2, the outside circular surface 9 lying on the side of the race surface 15 is more biased radially outwards away from the center of the ring 2 than the outside circular surface 9 lying on the side of the guide surface 18, so that the outside circular surface 9 on the inner ring 2 is made staggered or different in level on opposite sides of the inside grooved race 9 to make greater the race surface 15 than the effective contact length of the circular rolling surface 11 of the roller 3 and correspondingly less the guide part 16 in width than race surface 13.

The inside circular surface 8 of the outer ring 1 lying widthwise inside of the ring 1 is closer to the center 0 of the roller 3 rolling on the grooved race 6 than the inside circular surface 8 lying widthwise outside of the ring 1. Moreover, the outside circular surface 9 of the inner ring 2 lying widthwise outside of the ring 2 is closer to the center 0 of the roller 3 rolling on the grooved race 6 than the outside circular surface 9 lying widthwise inside of the ring 2. As the result of the construction as stated just earlier, there is a radial difference or gap t0 in level between the inside circular surface 8 lying on a mounting surface of the outer ring 1 and the inside circular surface 8 flanked by the outside grooved races 6. There is a radial difference or gap ti in level between the outside circular surface 9 lying on a mounting surface of the inner ring 2 and the outside circular surface 9 flanked by the inside grooved races 7. In addition, the effective contact length Lt1 common to the race surface 13 of the outside grooved race 6 and the race surface 15 of the inside grooved race 7 is made greater than the effective contact length Lr1 of the roller 3 while the widthwise dimension of the guide parts 14, 16 on the grooved races 6, 7 is made longer than Da/2, but shorter than the diameter Da of the roller 3. On the other hand, the guide surfaces 17, 18 in the guide parts 14, 16 of the outer ring 1 and the inner ring 2 are made in inclined or tapered slant surfaces 42, each of which slants to make a right angle relative to the rotating center 0 of the roller 3 and has a widthwise dimension spreading across the rotating center 0 of the roller 3 over a length enough to prevent the skew of the roller 3, but Da/2 or less.

Figure 6:
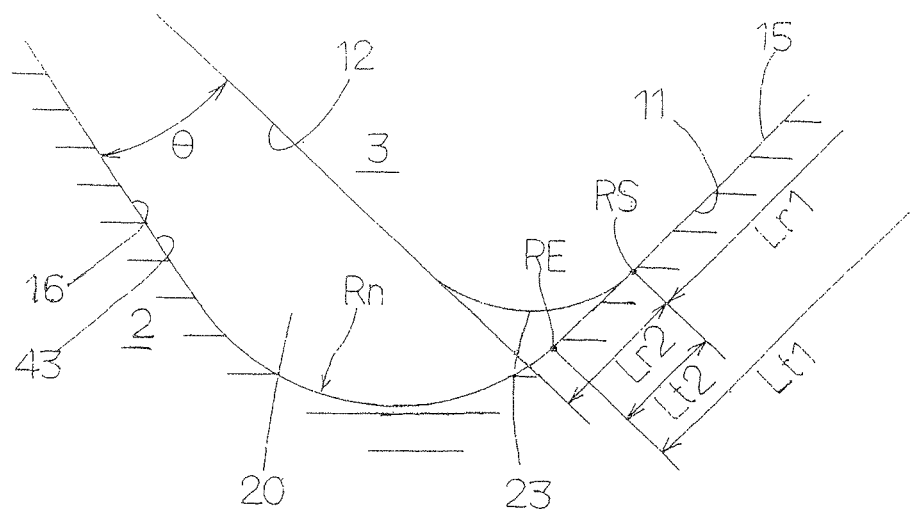
FIG. 6 is an enlarged view explanatory of an area encircled with a sign VI in FIG. 5.
Figure 7:
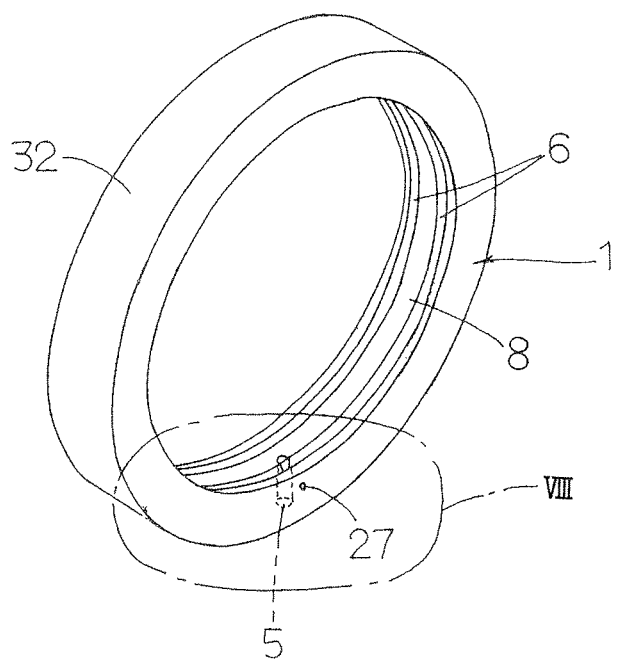
FIG. 7 is an enlarged view in perspective showing the grooved race cut in the outer ring of the turning bearing constructed according to the present invention.
Figure 8:
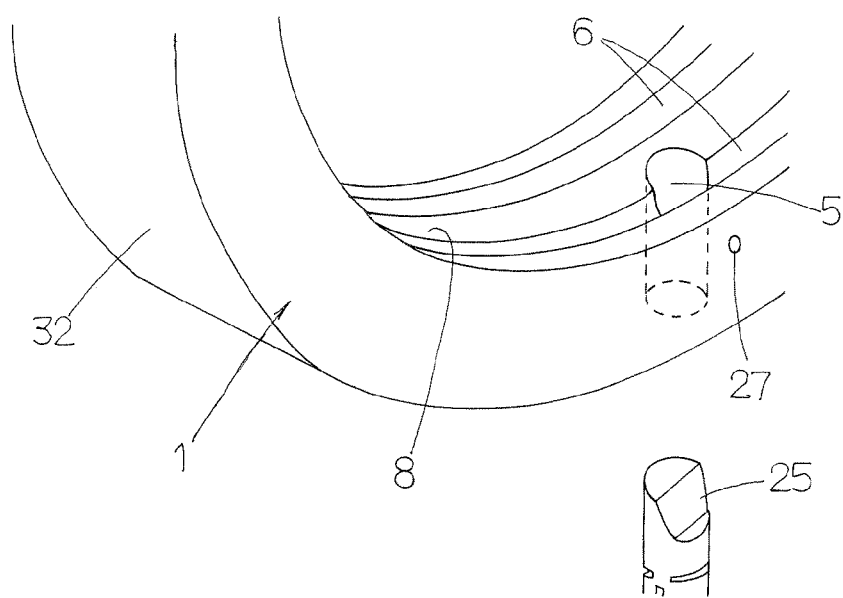
FIG. 8 is an enlarged view in perspective of an area encircled with a sign Viii in FIG. 7 to show the outer ring.
Figure 9:
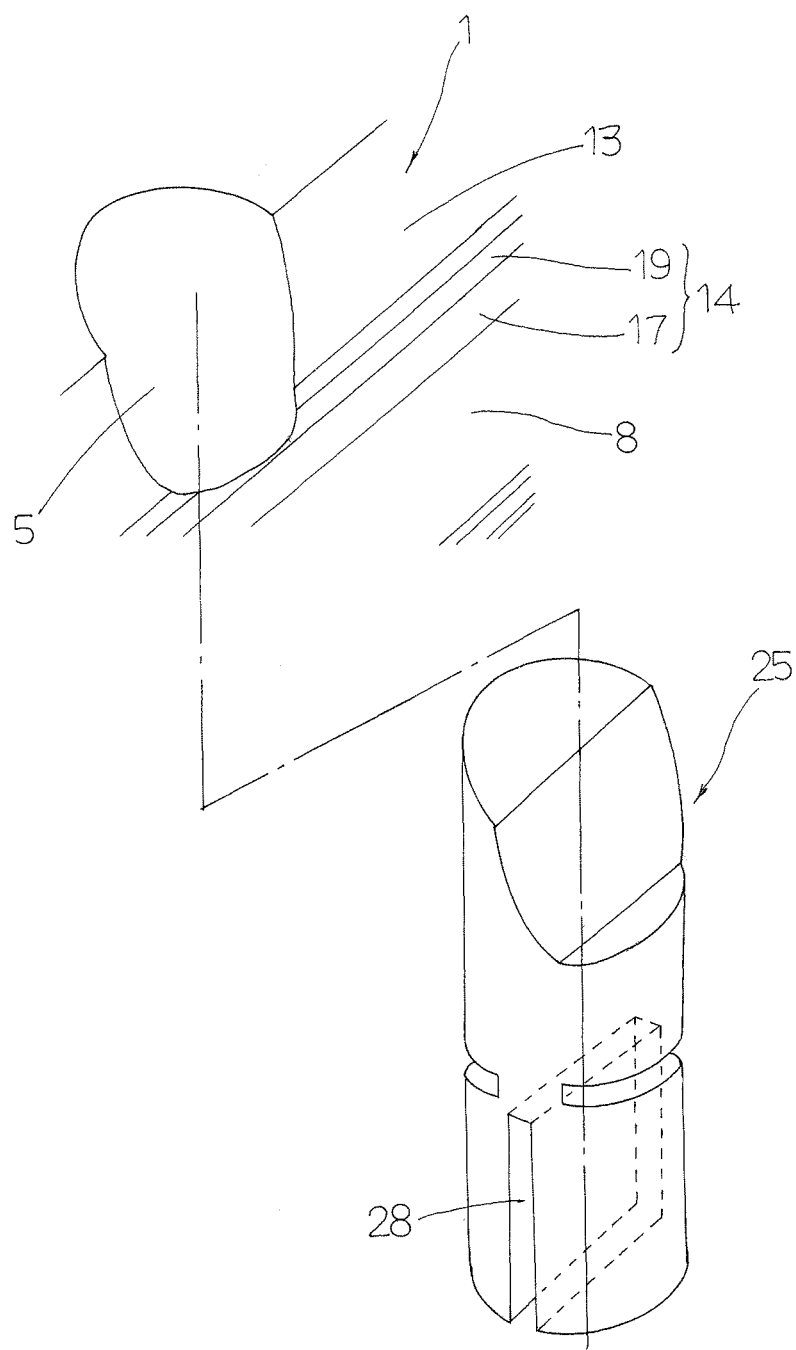
FIG. 9 is an enlarged view to explain the grooved race disposition in the outer ring of FIG. 8.

With the turning bearing of the present invention, a distance t of a clearance left between the inside circular surface 8 of the outer ring 1 and the outside circular surface 9 of the inner ring 2 is kept constant across the overall widths of the outer ring 1 and the inner ring 2 with the exception of the locations of the grooved races 6, 7 and the circular slot to snugly fit over a dust-proofing sealing member. The relief sides 19, 20 are cut in the guide surfaces 17, 18 circularly of the outside grooved race 6 and the inside grooved race 7 in adjacency to the race surfaces 13, 15. The relief sides 19, 20 each have a widthwise dimension of less than Da/2 in the radial direction of the roller 3. Relief spaces defined between the relief sides 19, 20 and the circular rolling surface 11 of the roller 3 incorporated in the raceway 10 have wedged shape when viewed in a transverse cross-section taken on the plane lying on the radial direction of the bearing. The relief sides 19, 20 as shown in FIG. 6 extend from the guide surfaces 17, 18 away from the axially opposite ends of the roller 3 at angles θ relative to the axially opposite ends of the roller 3. Upon simultaneous machining of the guide parts 14, 16 and the race surfaces 13, 15 on the outer ring 1 and the inner ring 2, the relief sides 19, 20 are made with tapered surfaces 43 extending across the widthwise dimension of Da/2 or less in the radial direction of the roller 3. More especially, each of the tapered surfaces 43 extends towards the race surface 13 or 15 with more inclination than in the guide surfaces 17 or 18 to form the relief space of the wedged shape in transverse cross-section. In addition, the tapered surfaces 43 are each rounded at a location crossing with an extension of the race surface 13 or 15. In the embodiment, the angle θ was 12 degrees. The arced shape at the locations where the relief sides 19, 20 cross with the race surfaces 13, 15 as shown in FIG. 6 had the radius of curvature of 0.5 mm at the maximum. The depth of the relief sides 19, 20 below the guide surfaces 17, 18 was less than 10% of the diameter Da of the roller 3, especially 7.5%, namely 0.45 mm. The turning bearing of the present invention may be applied to another version in which the grooved races are designed in front-to-front arrangement.

Figure 10:
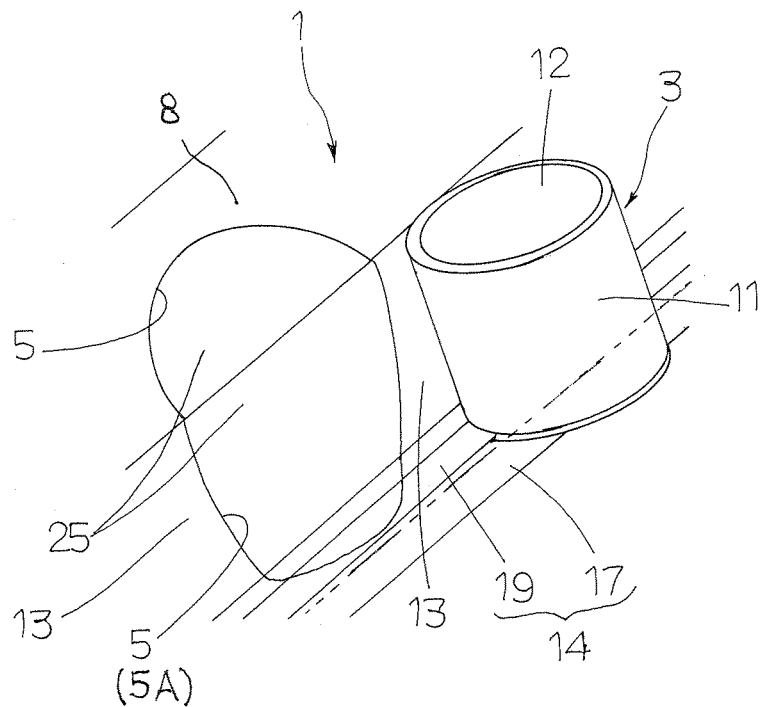
FIG. 10 is an enlarged view to explain a geometric relation of the grooved race disposition of FIG. 8, a closure and the roller.
Figure 11:
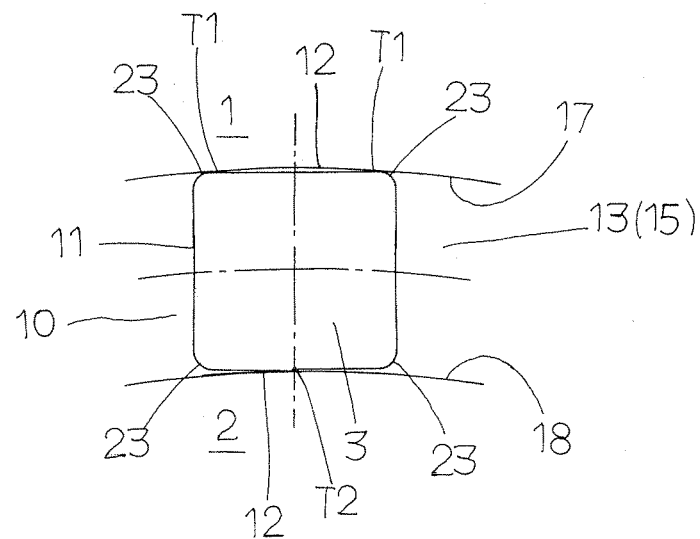
FIG. 11 is a view explanatory of the roller rolling through the raceway defined between the inside on the outer ring and the outside grooved race on the inner ring.

With the turning bearing of the present invention, as shown in FIG. 6, the effective contact length Lt1 of the race surface 13, 15 is designed longer than the effective contact length Lr1 of the roller 3. Now considering that the effective contact length of the roller 3 is Lr1, the effective contact length of the race surface 13, 15 is Lt1 and the axial length of a rounded bevel 23 of the roller 3 is Lr2, the relations of them are Lr1<Lt1 and Lt1<Lr1+2×Lr2. Moreover, an end or end point RE, lying nearby guide part 14, 16, of the effective contact area of the race surface 15 is closer to the any one of the axially opposite ends 12 of the roller 3 than the outset RS of the rounded bevel 23 on the roller 3 and lies within the dimensional range of the rounded bevel 23. When the length Lt2 is expressed as the length of from the outset RS of the rounded bevel 23 of the roller 3 to the end or end point RE of the effective contact area on the race surface 13, 15, the relation between Lt2 and Lr2 is Lt2<Lr2. With the race surface 13 of the outer ring 1 and the race surface 15 of the inner ring 2, more especially, the end or end point RE continuing with the relief side 19, 20 to form the beginning of the race surface 13, 15 is closer to the any one of the axially opposite ends 12 of the roller 3 than the outset RS of the rounded bevel 23 on the roller 3 and lies within the dimensional range of the rounded bevel 23. As shown in FIGS. 5 and 11, the end 12 of the roller 3 sliding contact with the outside grooved race 6 in the outer ring 1 is guided while born against the guide surface 17 on substantially point contact phase at two contact locations T1 diametrically opposite circumferential edges of the roller 3. On the other hand, another end 12 of the roller 3 sliding contact with the inside grooved race 7 of the inner ring 2 is guided while born against the guide surface 18 on substantially line contact phase at a single contact location T2 lying on the rotating center 0 of the roller 3. Referring to FIG. 10, there is illustrated a contact phase carried out between the guide surface 17 in the outside grooved race 6 on the outer ring 1 and one end 12 of the axially opposite ends 12 of the roller 3. A dash-and dot line on the guide surface 17 follows loci where the end 12 of the roller 3 comes into contact with the guide surface 17. The opening edge 15A of the loading hole 15 is out of the guide surface 17 and, therefore the roller is allowed to roll smoothly without falling into or stranding on the gap or difference caused by the loading hole 5 and the closure 25.

Various shapes of the separator may be available for the turning bearing constructed according to the present invention. For example, a version of the separator is shown in FIGS. 12 to 16. Another version is shown in FIG. 17 and a further another version is shown in FIG. 18.

Figure 12:
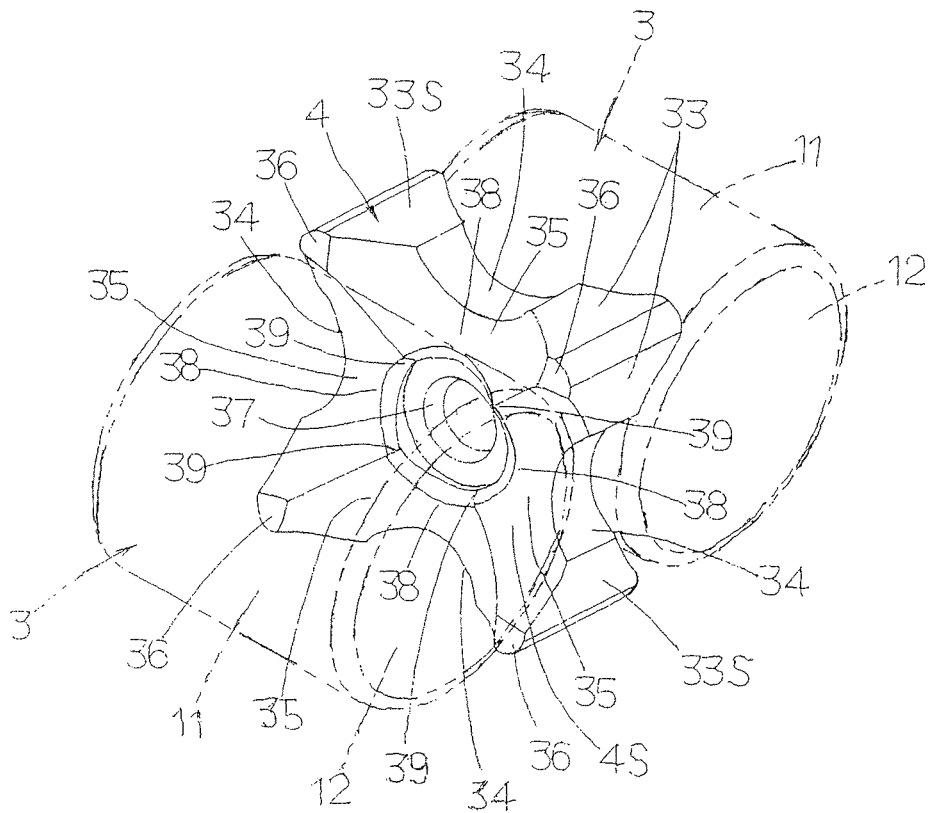
FIG. 12 is a view in perspective showing a preferred embodiment of a separator incorporated in the turning bearing.

The separator 4 will be hereinafter described in detail with reference to FIGS. 12 to 16. The separator 4 is charged or loaded through the loading hole 5 into the raceway 10 defined between the outside grooved race 6 on the outer ring 1 and the inside grooved race 7 on the inner ring 2 in such a way that the separator 4 is interposed between adjoining rollers 3. To this end, the separator 4 is designed to have a major body 40 of a substantially quadrilateral configuration surrounded with the peripheral surface 33 of four sides 33S each of which has a thickness in the traveling direction of the roller 3 enough to space out the rollers 3 apart from each other in the traveling direction of the rollers 3. The separator 4 is further provided at the center of the major body 40 with the through-hole 37. That is, the separator 4 has the substantially quadrilateral configuration when viewed from the side of a concaved surface 35 to fit over the circular rolling surface 11 of the roller 3. Recesses 34 are made on the sides 33S of the peripheral surface 33 of the separator 4, one to each side 33S. On the leading and trailing sides 4S of the separator 4 to fit over the circular rolling surface of the roller 3, there are provided the concaved surfaces 35 which each extend in the direction of the circular rolling surface between the opposite sides 33S with arcing in transverse cross-section in conformity with circular rolling surface 11 of the roller 3, and cross at 90 degrees each other in a crisscrossed relation. The raised flats 36 are formed at four corners. The separator 4 is installed in the raceway 10 such that the peripheral surface 33 lies in opposition to both the guide parts 14, 16 and the race surfaces 13, 15 of the grooved races 6, 7 on the outer ring 1 and the inner ring 2. With the separator 4, more especially, each of the concaved surfaces 35 arcs in transverse cross-section between the sides of the peripheral surface 33 lying in opposition to the race surfaces 13, 15. Portions 39 protruding in the axial direction of the separator 4 to come into contact with the roller 3 are formed on the circular edge of the through-hole 37 at four locations lying on phantom lines connecting the center and four raised corners 36 of the separator 4. The concaved surface 35 on the side 4S of the separator 4 is arched in transverse cross-section in conformity with the rolling surface 11 of the roller 3, as shown in FIGS. 12 and 13, and born against the roller 3 for rotation only at a narrow area near around the middle in the axial direction of the roller 3.

Figure 13:
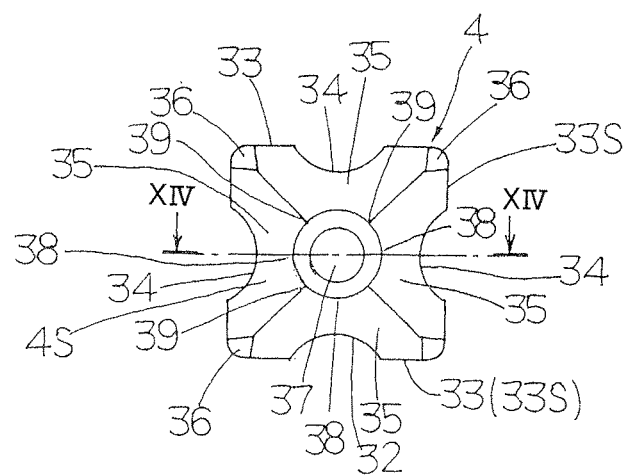
FIG. 13 is a view in front elevation showing any one of leading and trailing sides of the separator of FIG. 12.
Figure 14:
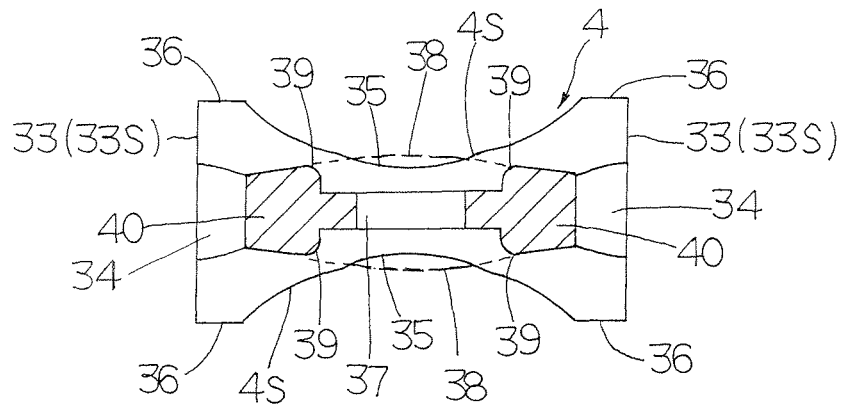
FIG. 14 is an enlarged view in transverse cross-section of the separator, taken on the plane lying on the lines XIV-XIV of FIG. 13.
Figure 15:
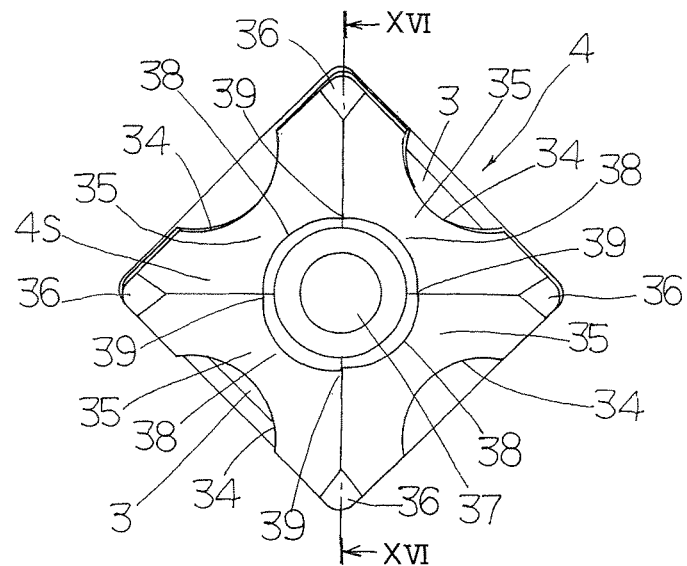
FIG. 15 is a view in front elevation showing a side of the separator to fit over the roller.
Figure 16:
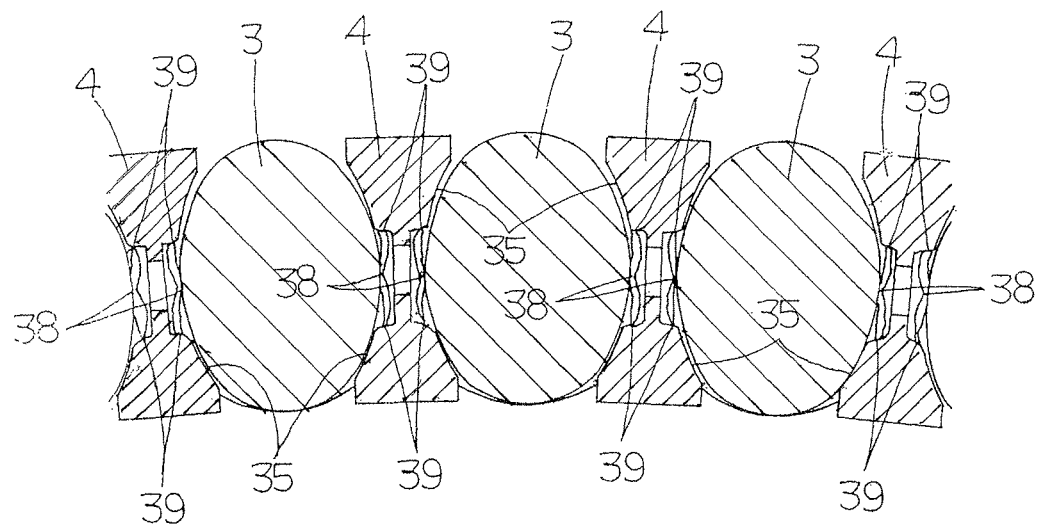
FIG. 16 is a view explanatory of disposition between the rollers and the separators, taken on the plane lying on the lines XVI-XVI of FIG. 15 and seen from a through-hole of the separator.

The separator 4 has a major body 40 on which the concaved surfaces 35 as shown in FIG. 13 are formed in symmetry to make the crisscrossed relation around the central through-hole 37, ensuring the correct contacting condition with the rollers 3 irrespective of in which posture the separator 4 is loaded in the raceway 10. Moreover, the concaved surfaces 35 on the separator 4 are contoured in arced or curved profiles that the concaved surfaces 35 bulge or rise gradually as shown in FIG. 14 to provide the arcing bulge 38 as their concavities get closer towards the centers thereof. It will be considered that the separator 4 comes into contact with the circular rolling surface 11 of the roller 3 in different contact conditions or postures. Considering the separator 4 comes into contact with the roller 3 in an inclined condition relative each other, the arcing bulge 38 makes only a point contact with the roller 3 in either of a circumferential direction and an axial direction of the roller 3 depending on relative tilted contact condition between the roller 3 and the separator 4, so that the arcing bulge 38 functions staving off the surface contact between the separator 4 and the roller 3 thereby keeping the contact condition reducing the frictional resistance encountered between the surfaces of the separator 4 and the roller 3. The recesses 34 on the sides 33S of the peripheral surface 33 around the separator 33 are made arced in transverse cross-section on the plane perpendicular to the axial direction of the separator 4. The through-hole 37 in the separator 4 is counterbored on the opposite sides of the separator 4 to have stepwise radially enlarged areas which serve as lubricant reservoirs. With the separator 4 constructed as stated just earlier, the flow of lubricant is made easier by combination of the central hole 37 with the recesses 34 on the peripheral 33. The circular rolling surface 11 of the roller 3 as shown in FIGS. 15 and 16 comes into contact with the separator 4 in the vicinity of the through-hole 37 lying at the center of the concaved surfaces 35 of the separator 4. With the separator 4 of the substantially quadrilateral configuration when viewed from the concaved surface 35 to fit over the roller 3, each side 33S of the quadrilateral was for example 5.95 mm and the four arced recesses 34 cut on the peripheral surface 33 were identical each other in dimension, for example each having a radial dimension of 1.5 mm. The concaved surfaces 35 crisscrossed each other to fit over the roller 3 were each made to have a radial dimension of for example 3.1 mm. The through-hole 37 counterbored at the opposite ends thereof had a diameter $\phi$ of, for example 1.5 mm at the axial middle area thereof and 2.5 mm at axially opposite counterbored ends. The raised portions 36 whose tops are made flat are at four corners of the separator 4 when viewed at the front of the separator 4. The concaved surfaces 35 of the separator 4, as intersecting in perpendicular to each other as shown in FIGS. 12, 13 and 15, are narrow about the through-hole 37, but radiate outward or splay out towards each of the sides 33S to form four substantially triangular configurations each of which diverges from the location near the through-hole 37 towards the side 33S. More especially, the concaved surfaces 35 of the separator 4 at their sides 33S confront the circular rolling surface 11 of the roller 3 over wide area of the axial dimension of the circular rolling surface 11 of the roller 3. In other words, the separator 4 fits over the circular rolling surface across wider area near the axially opposite ends 12 of the roller 3 than about the middle in the axial direction of the roller 3. Thus, the concaved surface 35 splays out towards the side 33S to the dimension near the diameter of the axially opposite ends 12 of the roller 3.

Figure 17:
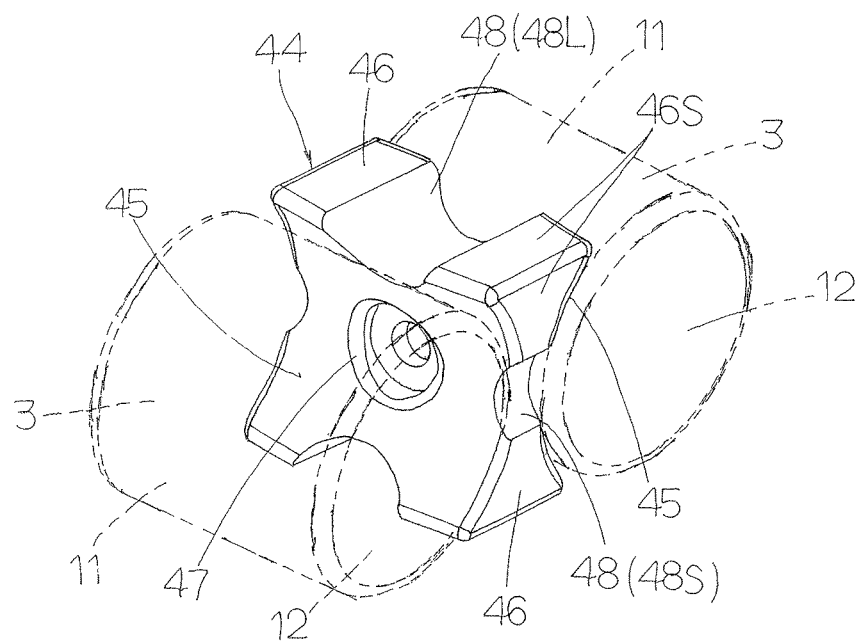
FIG. 17 is a view in perspective showing another version of the separator flanked by the rollers.
Figure 18:
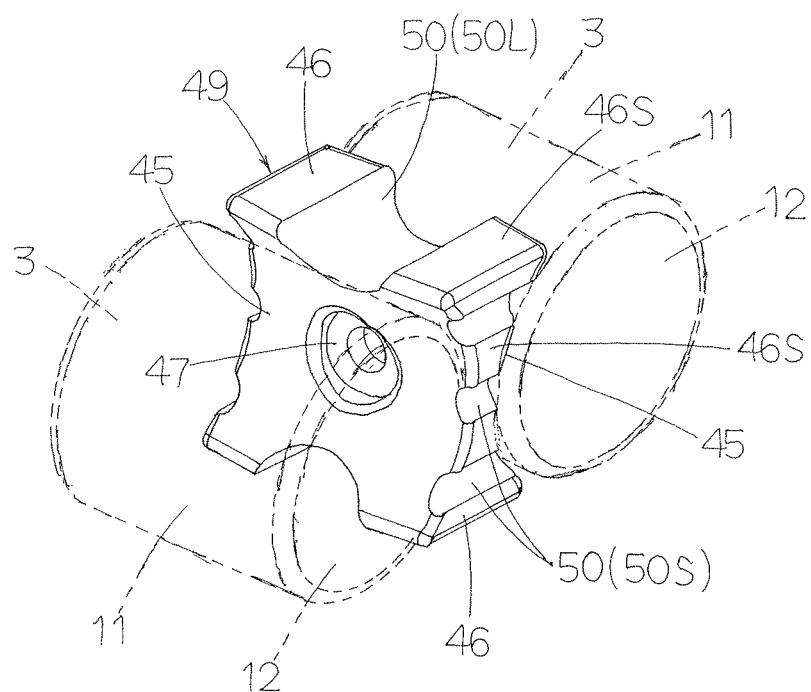
FIG. 18 is a view in perspective showing a further another version of the separator as shown in FIG. 13.
Figure 19:
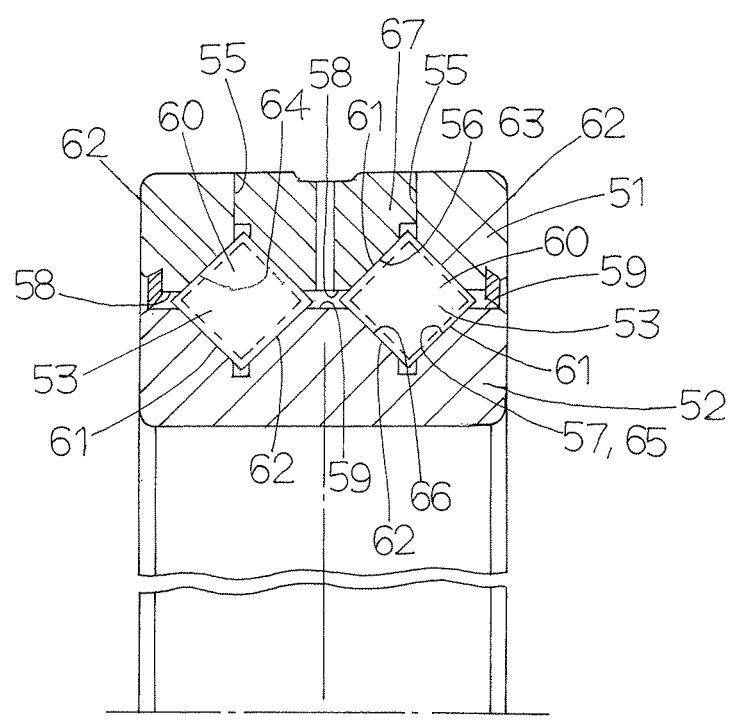
FIG. 19 is a view in transverse cross-section showing a prior double-row roller bearing in which the rollers roll through the raceways defined between the inside grooved races cut in the outer ring and the outside grooved races cut in the inner ring.
Figure 20:
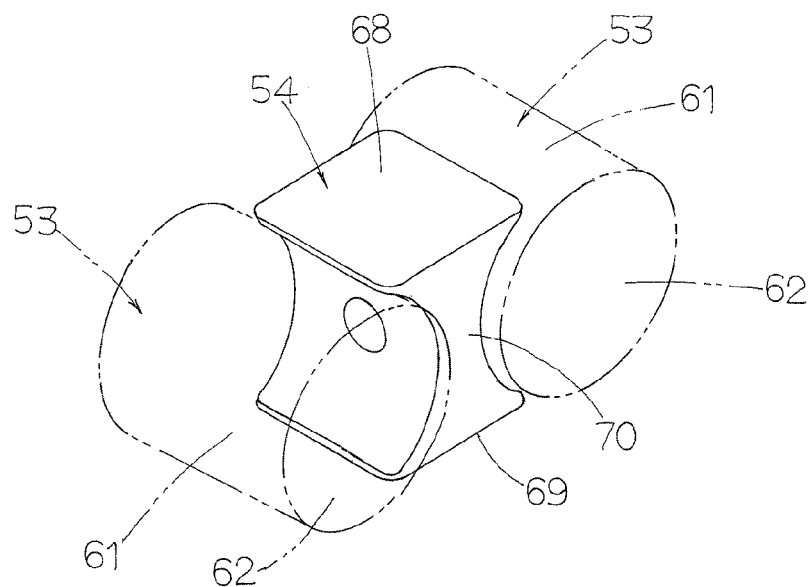
FIG. 20 a view in perspective showing a prior separator lying between the rollers in the prior double-row roller bearing of FIG. 19.
Figure 21:
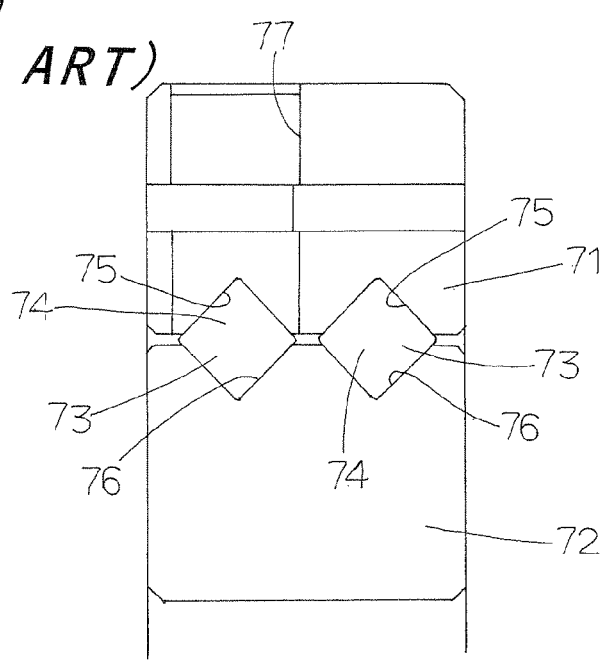
FIG. 21 is a view in transverse cross-section of the prior double-row roller bearing in which the loading hole to throw the rollers into the raceway is made every raceway, one to each raceway.

Next, referring to FIG. 17, there is shown another version of the separator 44 which is substantially similar in construction to the separator 4 constructed as stated earlier, excepting apart from a concavity 45 born against the circular rolling surface 11 of the roller 3 spreading in only one direction as opposed to the concaved surfaces 35 crisscrossed each other on the separator 4. The separator 44 has a thick body 46 having a widthwise dimension or a thickness enough to isolate the adjoining rollers 3 apart away from each other in the traveling direction of the rollers. The thick body 46 has a substantially quadrilateral or square shape defined with four peripheral sides 46S and further has a through-hole 47 at the center thereof. With the separator 44, moreover, the peripheral sides 46S of the thick body 46 have recesses 48. More especially, major recesses 48L are made on the sides 46S lying in opposition to the race surfaces 13, 15 of the grooved races 6, 7, which make rolling contact with the circular rolling surfaces 11 of the rollers 3. On the other hand, minor recesses 48S are made on the sides 46S lying in opposition to the guide parts 14, 16 of the grooved races 6, 7, which make sliding contact with the axially opposite ends of the rollers 3.

A further another separator 49 shown in FIG. 18 is substantially similar in construction to the separator 4 constructed as stated earlier, excepting apart from a concavity 45 born against the circular rolling surface 11 of the roller 3 spreading in only one direction as opposed to the concaved surfaces 35 crisscrossed each other on the separator 4. The separator 49 has a thick body 46 having a widthwise dimension or thickness enough to isolate the adjoining rollers 3 apart away from each other in the traveling direction of the rollers. The thick body 46 has a substantially quadrilateral or square shape defined with four peripheral sides 46S and further has a through-hole 47 at the center thereof. With the separator 49, moreover, the peripheral sides 46S of the thick body 46 have recesses 50. More especially, major recesses 50L are made on the sides 46S lying in opposition to the race surfaces 13, 15 of the grooved races 6, 7, which make rolling contact with the circular rolling surfaces 11 of the rollers 3. On the other hand, three minor recesses 50S are made on the sides 46S lying in opposition to the guide parts 14, 16 of the grooved races 6, 7, which make sliding contact with the axially opposite ends of the rollers 3.

What is claimed is:

1. A turning bearing having a loading hole to incorporate rollers with separators; comprising an outer ring provided on an inside circular surface thereof with two rows of outside grooved races, an inside ring provided on an outside circular surface thereof with two rows of inside grooved races in opposition to the outside grooved races of the outer ring, a plurality of the rollers lying in raceways defined between the outside grooved races and the inside grooved races to circulate through the raceways while bearing loads as the outer ring and the inner ring rotate relative to each other, a plurality of the separators lying in the raceways in an arrangement interposed between the rollers adjoining each other, and a closure closing the loading hole provided in either of the outer ring and the inner ring for charging the raceways with the rollers and the separators, wherein the loading hole to charge or incorporate the rollers into the raceways are provided every raceway, one to each raceway, and wherein the loading hole extending radially of the bearing at a location that a center line of the loading hole lies set-off center of the rollers rolling through raceways.

2. A turning bearing having a loading hole to incorporate rollers with separators constructed as defined in claim 1, wherein the outside grooved races and the inside grooved races include race surfaces on which circular rolling surfaces of the rollers are allowed to roll through and guide parts to guide one of axially opposite ends of the rollers, the guide parts being composed of guide surfaces to guide in a sliding manner axially opposite ends of the rollers and relief sides reaching bottoms of the raceways, and wherein an opening edge of the loading hole is exposed to the raceway at a location biased out of the guide part to range across from the race surface to the relief side of the guide part.

3. A turning bearing having a loading hole to incorporate rollers with separators constructed as defined in claim 1, wherein the loading hole has a circular configuration in a transverse cross-section.

4. A turning bearing having a loading hole to incorporate rollers with separators constructed as defined in claim 3, wherein the loading hole in transverse cross-section has a diametral dimension larger than a diagonal length of the roller, the diagonal length being expressed by $(Da^2+Lr^2)^{1/2}$ in which Da denotes a diametrical length of the roller and Lr denotes an axial length of the roller.

5. A turning bearing having a loading hole to incorporate rollers with separators constructed as defined in claim 1, wherein the closure to close the loading hole has an innermost end which is exposed to the raceway and formed to conform in shape to the raceway, and further the closure has an outermost end kept at a location receding below an outside edge of the loading hole.

6. A turning bearing having a loading hole to incorporate rollers with separators constructed as defined in claim 1, wherein the outer ring has two rows of the outside grooved race of a V-shape in a transverse cross-section and the inner outer ring has two rows of the inside grooved race of a V-shape in a transverse cross-section, the outside grooved race and the inside grooved race each having a race surface on which the circular rolling surfaces of the rollers are allowed to roll through and a guide part to guide one of axially opposite ends of the rollers, and wherein the inside circular surface of the outer ring is staggered or different in level on opposite sides of the outside grooved race to form the race surface greater than the guide part and the outside circular surface of the inner ring is staggered or different in level on opposite sides of the inside grooved race to form the race surface greater in wide dimension than the guide part.

* * * * *